United States Patent
Ogden et al.

(10) Patent No.: US 7,505,624 B2
(45) Date of Patent: Mar. 17, 2009

(54) BLOCK-BASED IMAGE COMPRESSION METHOD AND APPARATUS

(75) Inventors: Charles D. Ogden, Los Gatos, CA (US); Aaftab Munshi, Los Gatos, CA (US)

(73) Assignee: ATI Technologies ULC, Markham, Ontario (CA)

( * ) Notice: Subject to any disclaimer, the term of this patent is extended or adjusted under 35 U.S.C. 154(b) by 651 days.

(21) Appl. No.: 11/139,307

(22) Filed: May 27, 2005

(65) Prior Publication Data

US 2006/0269127 A1  Nov. 30, 2006

(51) Int. Cl.
G06K 9/00 (2006.01)
(52) U.S. Cl. .................................... 382/166
(58) Field of Classification Search ............... 382/162, 382/166, 167; 345/589, 600, 605; 348/253, 348/256, 645, 646, 649, 651, 655, 703; 358/500, 358/515, 518, 520
See application file for complete search history.

(56) References Cited

U.S. PATENT DOCUMENTS

| | | | |
|---|---|---|---|
| 4,580,134 A * | 4/1986 | Campbell et al. ........... | 345/589 |
| 4,821,208 A | 4/1989 | Ryan et al. | |
| 4,887,151 A | 12/1989 | Wataya | |
| 4,974,071 A | 11/1990 | Maeda | |
| 5,046,119 A | 9/1991 | Hoffert | |
| 5,430,464 A | 7/1995 | Lumelsky | |
| 5,452,017 A * | 9/1995 | Hickman ..................... | 348/646 |
| 5,544,286 A | 8/1996 | Laney | |
| 5,576,845 A | 11/1996 | Komatsu | |
| 5,585,944 A | 12/1996 | Rodriguez | |
| 5,619,591 A | 4/1997 | Tsang et al. | |

(Continued)

FOREIGN PATENT DOCUMENTS

JP  5216993  8/1993

(Continued)

OTHER PUBLICATIONS

Belur V. Dasarathy; Image Data Compression—Block Truncation Coding; IEEE; pp. 55-121; Los Alamitos, California.

(Continued)

Primary Examiner—Jose L Couso
(74) Attorney, Agent, or Firm—Vedder Price P.C.

(57) ABSTRACT

A block-based image compression method and encoder/decoder circuit compress a plurality of pixels in a block where each pixel includes a corresponding color value and a corresponding luminance value. The encoder circuit includes a luminance-level-based representative color generator to generate representative color values for each of a plurality of luminance levels to produce at least a high color value and a low color value. In response to generating the representative color values, the luminance-level-based representative color generator associates each of the pixels in the block with one of the plurality of representative color values to produce corresponding bitmap values. The encoder circuit further includes a color type block generator to perform at least one of: (a) generate block color data indicating a regular/alternate color block type and (b) representing a block color type by ordering the representative color values that are to be sent to a decoder. The alternate color type block data is generated based on at least comparing the representative low color value to a first brightness threshold and comparing the high color value to a second brightness threshold.

42 Claims, 8 Drawing Sheets

U.S. PATENT DOCUMENTS

| | | | |
|---|---|---|---|
| 5,682,249 | A | 10/1997 | Harrington et al. |
| 5,734,744 | A | 3/1998 | Wittenstein et al. |
| 5,742,892 | A | 4/1998 | Chadda |
| 5,748,174 | A | 5/1998 | Wong et al. |
| 5,748,904 | A | 5/1998 | Huang et al. |
| 5,787,192 | A | 7/1998 | Takaichi et al. |
| 5,805,226 | A | 9/1998 | Jung |
| 5,815,159 | A * | 9/1998 | Katayama et al. ............ 345/600 |
| 5,822,460 | A | 10/1998 | Kim |
| 5,822,465 | A | 10/1998 | Normile et al. |
| 5,956,425 | A | 9/1999 | Yoshida |
| 5,956,431 | A | 9/1999 | Iourcha et al. |
| 5,959,631 | A | 9/1999 | Knittel |
| 5,987,175 | A | 11/1999 | Imaizumi et al. |
| 6,005,971 | A * | 12/1999 | Bergman et al. ............ 382/165 |
| 6,075,619 | A | 6/2000 | Iizuka |
| 6,111,607 | A * | 8/2000 | Kameyama ................. 348/256 |
| 6,658,146 | B1 | 12/2003 | Iourcha et al. |
| 6,683,978 | B1 | 1/2004 | Iourcha et al. |
| 7,103,357 | B2 * | 9/2006 | Kirani et al. ............. 455/426.1 |
| 7,158,271 | B2 * | 1/2007 | Sawada ...................... 358/505 |

FOREIGN PATENT DOCUMENTS

| | | |
|---|---|---|
| WO | WO 97/08900 | 3/1997 |
| WO | WO 99/18537 | 4/1999 |

OTHER PUBLICATIONS

Andreas Schilling, Wolfgang Strasser, Gunter Knittel; Texram: A Smart Memory for Texturing; May 1996; IEEE Computer Graphics and Applications.

Graham Campbell; Two Bit/Pixel Full Color Encoding; 1984; vol. 20, No. 4; Dallas.

Ching-Yung Yang, Ja-Chen Lin; Hybrid Adaptive Block Truncation Coding for Image Compression; Apr. 1997; Society of Photo-Optical Instrumentation Engineers; Taiwan.

Anders Kugler; High-Performance Texture Decompression Hardware; 1997; The Visual Computer.

Panos Nasiopoulos, Rabab K. Ward and Daryl J. Morse; Adaptive Compression Coding; Aug. 1991; IEEE Transactions on Communications, New York, U.S.

G. Knittel, A Schilling, A. Kugler and W. Strasser; Hardware for Superior Texture Performance.

Edward J. Delp and Robert O. Mitchell; Image Compression Using Block Truncation Coding; 1979; IEEE.

C. Y. Yang and J. C. Lin; Use of Radius Weighted Mean to Cluster Two-Class Data; May 1994; vol. 30, No. 10; Electronics Letters.

John C. Russ; Optimal Grey Scale Images from Multiplane Color Images; 1995; vol. 7, No. 4; Journal of Computer-Assisted Microscopy.

Yushu Feng and Nasser M. Nasrabadi; A Dynamic Address Vector Quantization Algorithm Based on Inter-Block and Inter-Color Correlation for Color Image Coding; 1989; IEEE.

K. T. Lo and W. K. Cham; New Predicitve Classifiedl Vector Quantization Scheme for Image Compression; Aug. 1994; vol. 30, No. 16; Electronics Letters.

Kowk-Tung Lo and Wal-Kuen Cham; New Classified Vector Quantization of Images; 1993; IEEE, Beijing.

Edward J. Delp and Owen Robert Mitchell; Moment Preserving Quantization; 1991; IEEE.

Bing Zeng and Yrjo Neuvo; Interpolative BTC Image Coding with Vector Quantization; 1993; IEEE.

Maximo D. Lema and O. Robert Mitchell; Absolute Moment Block Truncation and Its Application to Color Images; 1984; IEEE.

Yiyan Wu and David C. Coll; Single Bit-Map Block Truncation Coding of Color Images; 1992; IEEE.

Mohammed Kamel, C. T. Sun and Lian Guan; Image Compression by Variable Block Truncation Coding with Optimal Threshold; 1991; IEEE.

Y. A. Alsaka and D. A. Lee; Three Level Block Truncation Coding; 1990; IEEE.

E. Walach; A Modified Block Truncation Coding Technique for Image Compression; 1983; IEEE.

Bernd Lamparter and Wolfgang Effelsberg; eXtended Color Cell Compression—A Runtime-efficient Compression Scheme for Software Video.

Takio Kurita and Nobuyuki Otsu; A Method of Block Truncation Coding for Color Image Compression; 1993; IEEE.

Soo-Chang Pei and Ching-Min Cheng; A Novel Block Truncation Coding of Color Images Using a Quaternion-Moment-Preserving Principle; 1997, IEEE.

Tak Po Chan; Bing Zeng and Ming L. Liou; Visual Pattern BTC with Two Principle Colors for Color Images; 1995; IEEE.

Quoping Qiu; Color Image Coding and Indexing Using BTC; 1994; IEEE.

K. W. Chan and K. L. Chan; Optimized Adaptive AMBTC; 1994; IEEE.

Eric Dubois; Effects of Digital Demodulation on Component Coding of NTSC Color Signals; 1979; IEEE.

* cited by examiner

BLOCK-BASED IMAGE COMPRESSION METHOD AND APPARATUS

FIELD OF THE INVENTION

The invention relates generally to data compression and decompression methods and, more particularly, to image compression and decompression of image data.

BACKGROUND OF THE INVENTION

Data compression is an extremely useful tool for storing and transmitting large amounts of data. For example, when compression is used to decrease the number of bits relative to the original image size, the amount of data transmitted is reduced and the time required to transmit the image can be reduced. For instance, it is known for a graphics processor to compress texture values representing an image. The compressed texture values may then be transmitted from one device to another, such as a computer, handheld device, portable phone, personal data assistant (PDA), wireless communication network or any suitable network element.

Block truncation coding (BTC) is an image processing technique for encoding and decoding digital image data, based on N×M (e.g., four-by-four) nonoverlapping "pixel" blocks. Color cell compression (CCC) is one example of extending the BTC method to color. The pixels of the block are partitioned into two groups, a representative color is chosen for each of these two groups, and a bitmap is generated with individual bits to indicate which group each pixel in the block is associated with. The compressed data for such a block typically consists of only two color values, or two color indices into a color palette, and the bitmap indicating which of the two groups each pixel belongs to. However, encoding only two colors for any given block may result in poor image quality, especially for blocks with diverse colors.

Digital color images may be compressed by encoding the chrominance (color) and luminance (brightness) values for each pixel contained therein. The color values may be described using a three component color space, such as an RGB component color space, where R represents the color red, G represents the color green and B represents the color blue. Eight-bit color values for each component may range from 0 to 255, with 255 representing the maximum amount of color or the highest value in the range. The combination of three eight-bit color components results in a 24-bit total color value per pixel. However, any number of bits per color, such as 16 bits, 32 bits, 64 bits or any other suitable number of bits, may represent the color of a pixel. Colors may alternatively be represented by a YIL color space, as is known in the art. Yet another color space, the CIE L*a*b* color space, represents a color based on components of luminance, labeled L*, a relative amount of red versus green, labeled a*, and a relative amount of yellow versus blue, labeled b*. Colors in these color spaces are then blended together in appropriate ways in order to produce a full spectrum of colors. In the L*a*b* luminance-chrominance color space, an L*=0 (luminance) value means that no light is present (i.e., the pixel location is completely black), while a*=0 means no red or green is present and b*=0 means that the pixel location is neither blue nor yellow. The occurrence of both a*=0 and b*=0 together means that the pixel location is gray (somewhere between black and white). In contrast, the hexidecimal value 255 represents the maximum amount of a color or the highest value in the range (maximum light/white, red and yellow, respectively, for L*a*b*). Similarly, in a gray-scale pixel map, pixel values may range from 0 for black to 255 for the whitest tone possible.

Since BTC/CCC methods quantize each block to just two representative colors or luminance values, image degradation may be significant. Some variations of BTC/CCC encode two representative colors, but imply one or two additional colors based on the two encoded colors. If the colors in the block are relatively dispersed, such as when the colors include near black and bright colors, then the two representative colors may not properly represent the colors in the original image. For example, if the two representative color values represent the intermediate colors, then the two representative color values may not accurately represent extreme colors, such as black and white. If the two color levels that are selected to represent each block are not properly representative of the block, then the colors in the final decoded output image may not accurately represent those in the original image.

BTC/CCC methods are also known to encode pixel information for each of the colors red, green and blue as separate BTC/CCC blocks. As a result, these methods produce six code words (i.e. R1, R2, G1, G2, B1, B2)) and three separate bitmaps to indicate how each channel should be reconstructed. This method of adapting BTC to color comes at the cost of bitmap data that is three times larger than the other algorithms use.

A variation of CCC stores two encoded colors as eight-bit indices into a 256-entry code book lookup table. However, such pixel blocks cannot be decoded without fetching additional information, which increases computational complexity and can consume additional memory bandwidth. Further, the transmission of a code book decreases system performance due to the increased data transmission and the additional overhead due to the required memory accesses to translate code words via the code book. As a result, these methods may be memory-intensive in terms of speed and bandwidth, and further may require large amounts of memory. Additionally, two colors may not properly represent diverse colors in the original image.

BTC methods are also known to perform three-level block truncation coding of color images. Two representative colors are encoded along with a bitmap containing two bits per pixel to indicate which of the three color levels each pixel belongs. One of the three color levels is derived from the two encoded colors—usually the color half way between them. A known extension of this method is to use the two bits per pixel in the bitmap to represent four levels instead of three and to derive the two additional colors one-third and two-thirds of the way between the two encoded colors. However, if the colors in the block are relatively dispersed, such as when the colors include near black, near white, and some other more saturated color, then the two encoded colors, along with any implied colors, may not properly represent the colors in the original image. Since blending two of the three colors will not produce the third color in this scenario, the final decoded image may not accurately represent those in the original image Four level CCC methods that encode two colors to provide for three or four colors are also known to further provide information on which pixels, if any, are transparent. The transparency block type indicates whether one of the color levels indicates an actual color level or indicates that the corresponding pixel is transparent. Further, according to this known method, the transparency block type is indicated based on whether one code word is greater than another, rather than on an encoded data bit.

BRIEF DESCRIPTION OF THE DRAWINGS

The present invention is illustrated by way of example and not limitation in the accompanying figures, in which like reference numerals indicate similar elements and in which.

DETAILED DESCRIPTION OF THE PREFERRED EMBODIMENTS

Figure 1:
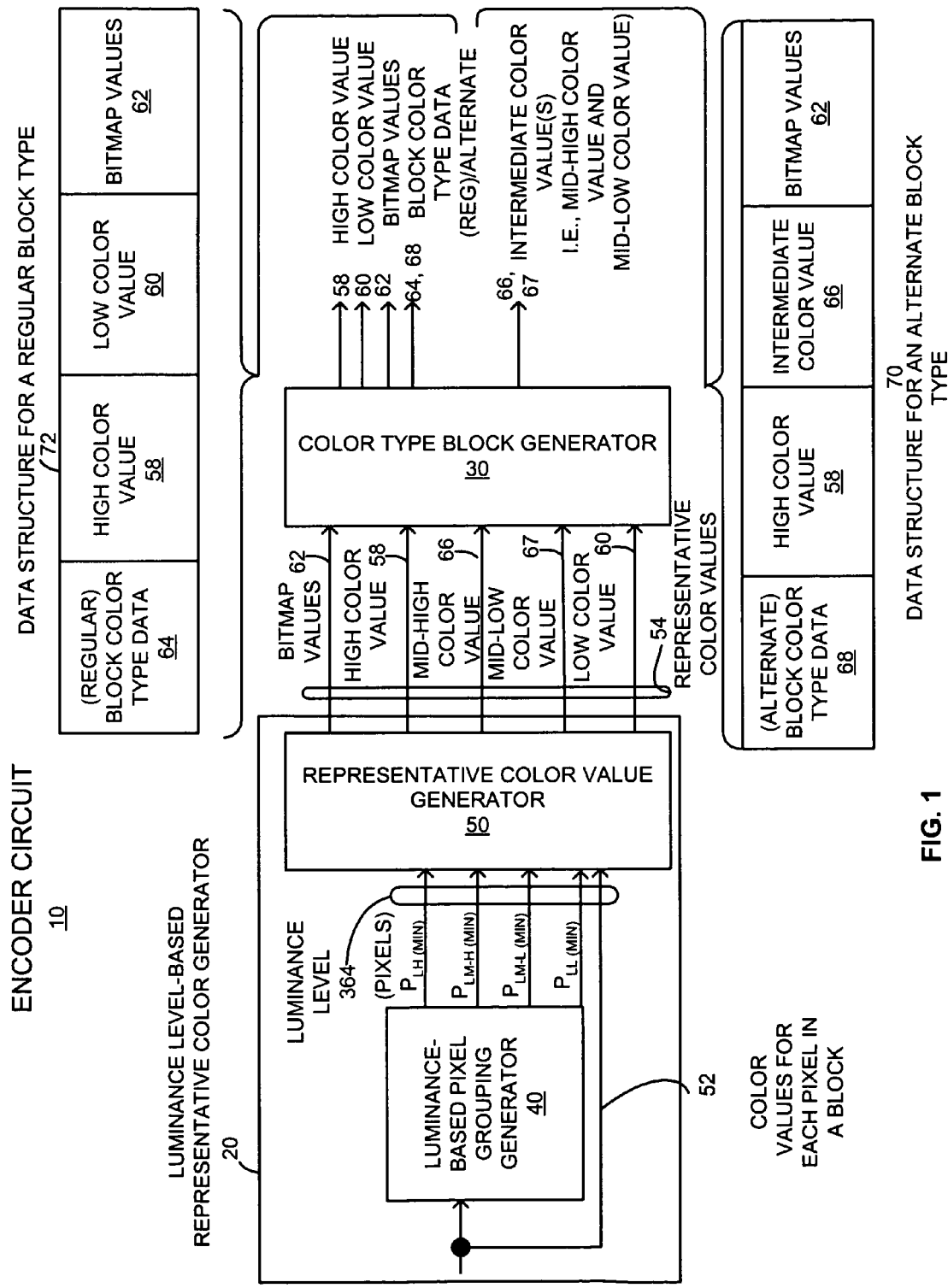
FIG. 1 is a block diagram illustrating one example of an apparatus to compress an image in accordance with one exemplary embodiment of the invention.

A block-based image compression method and encoder/decoder circuit compress a plurality of pixels in a block. Each pixel in the block is composed of a color value and its corresponding luminance value. The encoder circuit includes a luminance level-based representative color generator to generate representative color values for each of a plurality of luminance levels to produce, in one example, at least a high color value, a low color value and two intermediate color values are used to encode the original pixel colors. For example, one or more of the representative color values, such as the high color value and the low color value may be codewords for transmission in a communication system or storage in memory. The decoder may then use these two codewords to determine intermediate colors. In response to generating the representative color values, the luminance level-based representative color generator associates each of the original pixels in the block with one of the plurality of representative color values and produces a corresponding bitmap indicating (e.g., representing) that association. The encoder circuit further includes a color type block generator. The color type block generator performs at least one of: (a) generating block color data indicating a color block type and (b) representing a color block type by ordering sent representative color values. In one example, the alternate color type block data, or an indication that a block is an alternate color type block, is generated based on at least comparing the representative low color value to a first brightness threshold and comparing the high color value to a second brightness threshold; other tests may also be performed.

In one embodiment, a regular block type is indicated when the low color value does not correspond with a near black color value or group of black color values, or the high color value does not correspond with a bright color value, or group of bright color values, and when the generated low color value and high color value can be blended to give a reasonable approximation of the two intermediate (implied) color values. For example, for a regular color block type, the representative high and low colors are used as codewords and the decoder derives the medium high and medium low colors from these two sent color values. For an alternate color block type, where the encoder determines that that the representative low color is near black, the encoder uses the high color value and one of the intermediate color values, such as medium high, to allow the decoder to derive the medium low and low colors. This allows a more accurate representation of an intermediate color when a representative color is near black.

According to one embodiment, the block color type generator generates an intermediate color value corresponding with one of the luminance levels, when both the low color value corresponds with the near black color value and the high color value corresponds with the bright color value. In this case, the color type block generator generates the block color type data, indicating an alternate color block type. According to an alternative embodiment, the color type generator generates alternate block color data where one of the intermediate color values is encoded in the place of the low color value when the low color value corresponds to a near black color, the high color value corresponds to a "bright color," and the intermediate color values are not accurately approximated by blending the high color value and low color value together.

Among other advantages, the encoder/decoder circuits and methods adapt to different levels of color diversity within the block in order to accurately represent diverse colors in a block while achieving a high level of data compression. According to one embodiment, the encoder circuits identify conditions when colors within the pixel block are relatively diverse. For example, the various colors within the pixel block may be diverse when one or more colors in the block represent near black and one or more colors in a block represent a bright color value. In this situation, one of the encoded color values represents an intermediate color value so that, when a block includes a bright color value and a near black color value, the encoder circuit may also accurately represent one or more of the intermediate color values. The encoder circuit in effect detects that blending of the high and low color values can not reproduce the intermediate representative color. For example, if the representative low color value is black, the high color value is white and the intermediate color values are not shades of gray, the alternate color block type indication is necessary. Since the encoder circuit produces, as one of the code words, an actual intermediate color value rather than an estimated or interpolated color value, the resulting decoded image will more accurately represent the original image than if one of the intermediate color values were computed from diverse colors such as near bright and near black. The encoder/decoder circuit therefore provides excellent texture image quality as well as a high level of data compression. Further, the encoder and decoder circuit can be incorporated efficiently and inexpensively in hardware and/or software.

The encoder/decoder circuit and method produce excellent texture image quality while achieving a high level of compression. As a result, the decoder circuit and method are inexpensively implemented in software and/or hardware, making the decoder circuit and method suitable for hand-held devices, or any other suitable devices where memory footprint and power consumption are constrained.

However it will be recognized that any suitable device or combinations of devices may employ the encoder, decoder or methods described herein, such as but not limited to set-top boxes, desktop computers, wireless network elements, handheld devices, laptops, cameras, printers or any suitable device or system. As used herein, handheld devices may include portable devices such as but not limited to laptop computers, mobile telephones; personal digital assistants; navigation devices, including portable navigation devices; digital cameras; video cameras; DVD players or any other suitable portable devices, including portable devices suitable for transmitting or receiving image data. Additionally, the encoder/decoder circuit and method may be implemented in a suitable communication network. The communication network may be a wireless wide area network (WWAN), such as a CDMA, TDMA, 3G, PCS, iDEN or any suitable wireless type of communication network. For example, a network element may employ the encoder and a wireless handheld device may employ the decoder; or any device may include one or both of the encoder and decoder. Alternatively, the communication network may be a wireless local area network (WLAN), such as a Bluetooth® network, an 802.11 network or any other suitable short-range communication network. As used herein, network elements may include any component of a networked communication system such as a server or other suitable element in a wireless communication system, a server or other element or elements accessible via the Internet or any suitable device that may be coupled to a network.

FIG. 1 is a block diagram of an encoder circuit 10 to compress a plurality of pixels in a block, such as a texture block, image block or any suitable block of pixels according to one embodiment of the invention. The encoder circuit 10 includes a luminance-level-based representative color generator 20 and a color type block generator 30. The luminance-level-based representative color generator 20 further includes a luminance-based pixel grouping generator 40 and a representative color value generator 50.

The encoder circuit 10 may be one or more suitably programmed processors, such as a microprocessor, a microcontroller or a digital signal processor (DSP), and therefore includes associated memory containing instructions that, when executed, cause the encoder circuit 10 to carry out the operations described herein. In addition, the encoder circuit 10, as used herein, may include discrete logic state machines or any other suitable combination of hardware, software, middleware and/or firmware and may be incorporated into any suitable integrated circuit including but not limited to a graphics processor, CPU, or any suitable integrated circuit. For example, the encoder circuit 10, the luminance-level-based representative color generator 20, the color type block generator 30, the luminance-based pixel grouping generator 40 and the representative color value generator 50 may be software modules or drivers operating on a single microprocessor or may each be one or more suitably programmed processors, such as a microprocessor, a microcontroller or a digital signal processor, and therefore may further include memory containing instructions that, when executed, cause the encoder circuit 10 to carry out the operations described herein. The various elements of the encoder circuit 10 may be connected by a plurality of links. The links may be any suitable mechanisms for conveying electrical signals or data, as appropriate.

Figure 4:
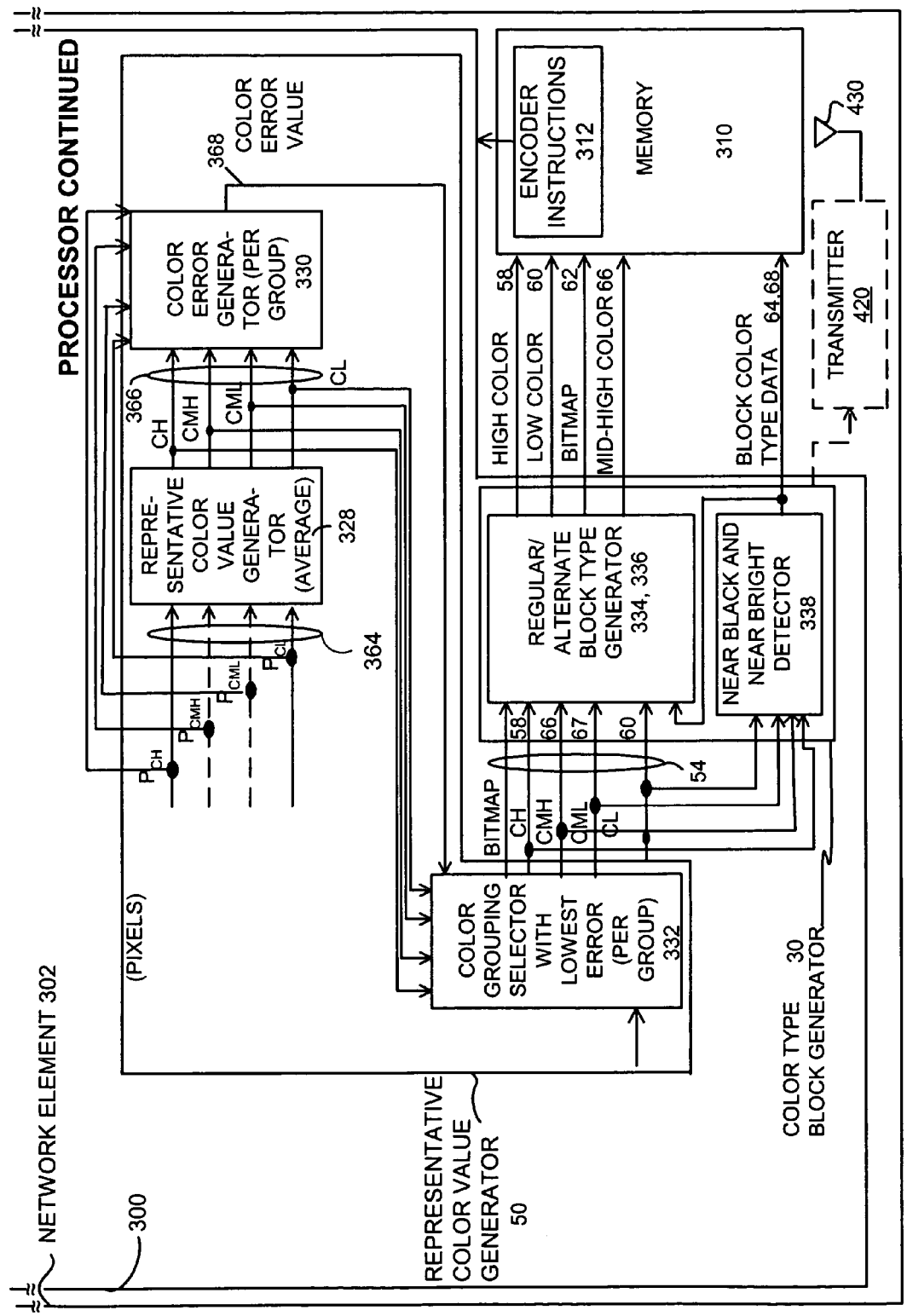
Figure 6:
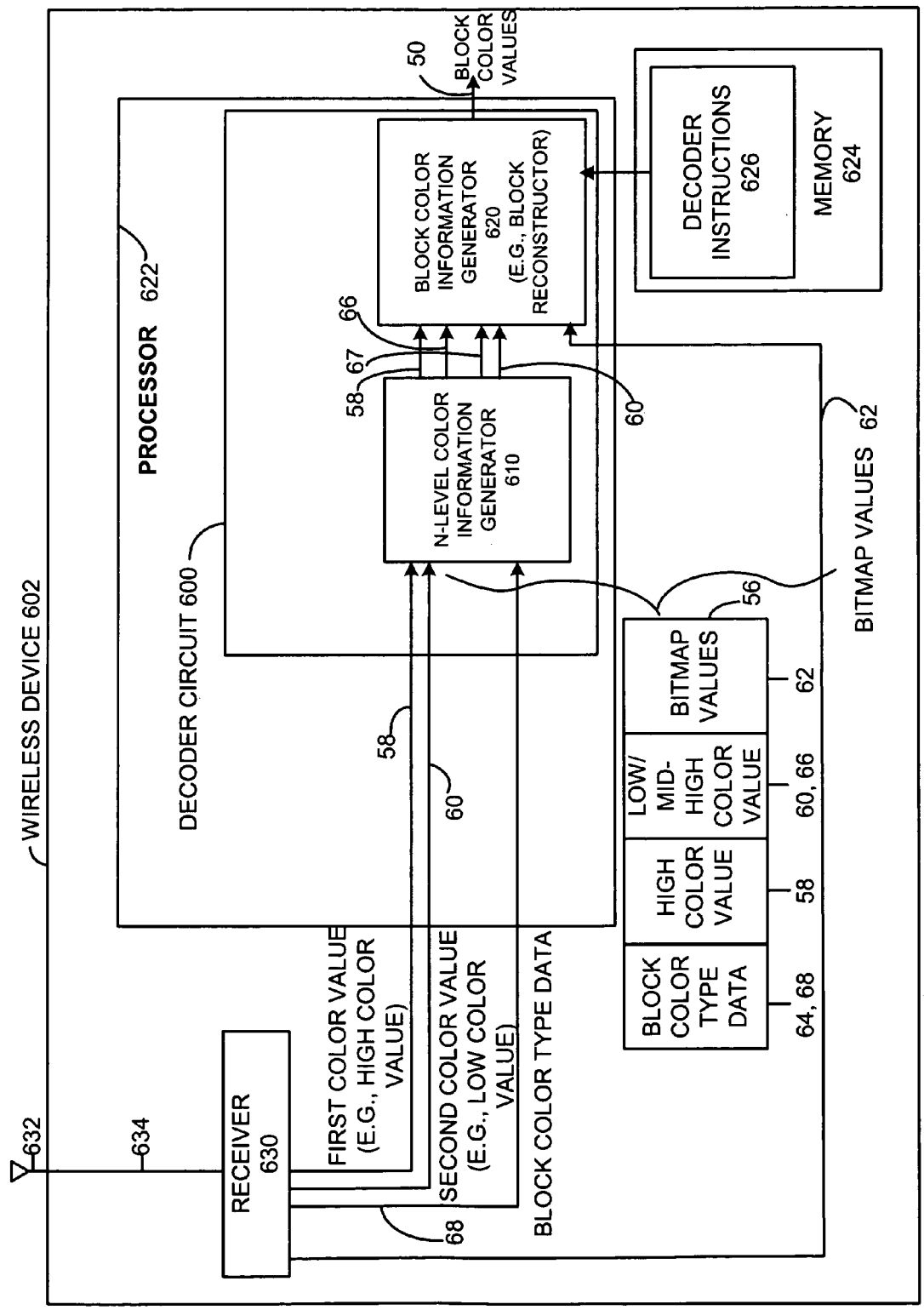
FIG. 6 is a block diagram illustrating an example of a decoder circuit in accordance with one exemplary embodiment of the invention.

According to one embodiment, the encoder circuit 10 may be part of a computer system, notebook computer, laptop computer, printer, copier or any portable computer or other processor-based system. The encoder circuit 10 may also be part of a processor-based game device suitable for operating on a network element or any suitable device for processing and/or rendering video and audio from an application such as a gaming application or any suitable application. The gaming application may include well known video game type applications (e.g., racing, fighting, adventure and hunting). The computer system or other processor-based system may include a central processing unit, co-processing units, video-graphics circuitry (e.g., graphics processor), system memory and other suitable circuits peripheral to the central processing unit or co-processing units. In such systems, the central processing unit functions as a host processor, while the video-graphics circuitry (e.g., a graphics coprocessor) functions as a loosely coupled coprocessor. By way of example, the video-graphics circuitry may include an integrated circuit on a single semiconductor die, such as an application-specific integrated circuit (ASIC) or may be integrated a part of a larger circuit structure, however any suitable structure may be used. Additionally, the video-graphics circuitry may include memory as shown in FIGS. 4 and 6, such as, but not limited to, dynamic random access memory (DRAM), programmable random access memory (PRAM), erasable programmable read only memory (EPROM), static memory or any other suitable type of memory. This memory may reside on the same semiconductor die (i.e., ASIC) as the video-graphics circuitry or it may be separate and connected through board level or package level traces. Similarly, the memory may be part of system memory, graphics memory or any other suitable memory. According to one embodiment, the operations described herein may be implemented via a software program or application including a driver program, executed by the host processor or other suitable processor.

Figure 2:
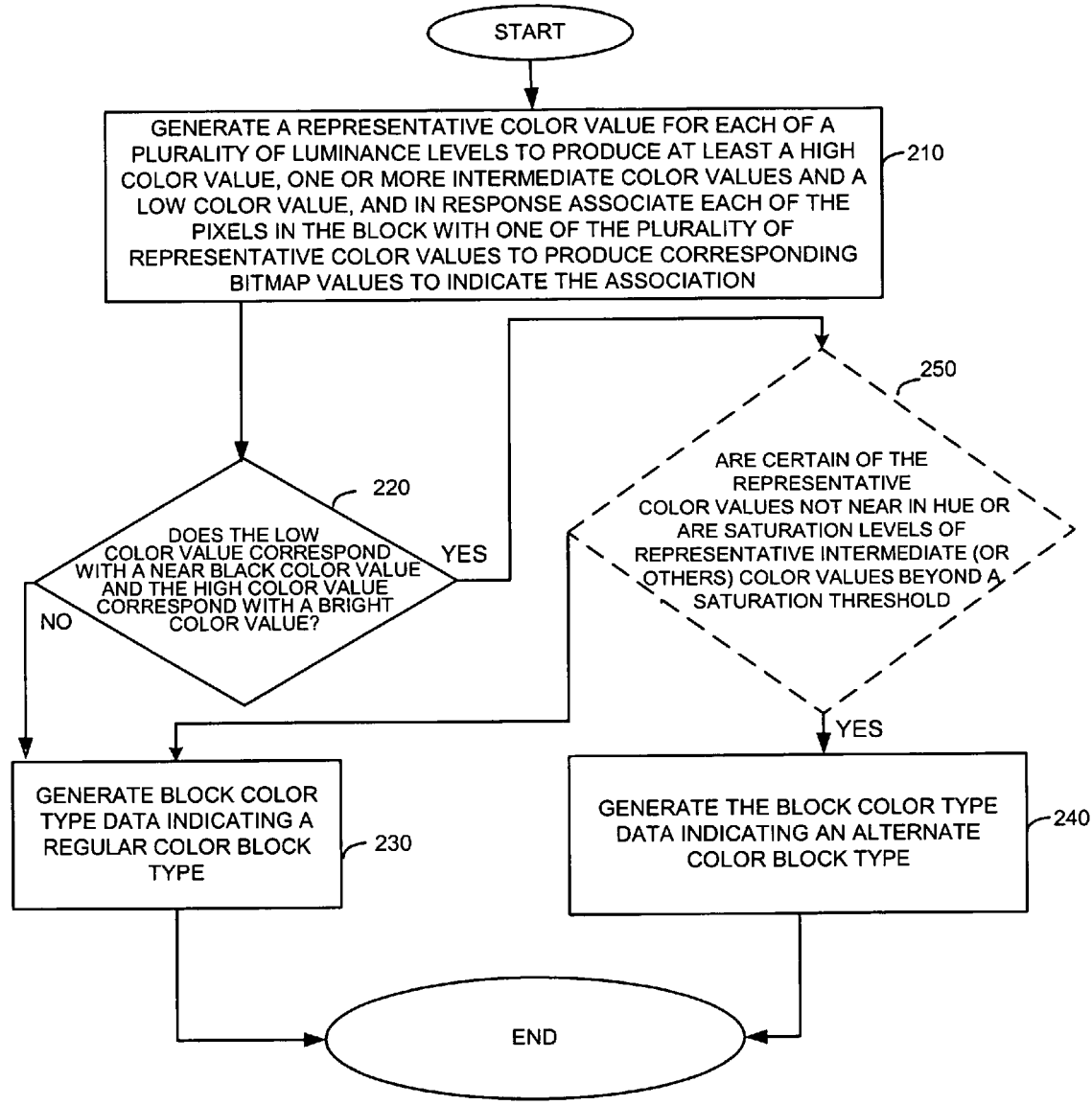
FIG. 2 is a flowchart illustrating an example of a method for compressing a plurality of pixels in a block in accordance with one exemplary embodiment of the invention.

FIG. 2 shows a method of compressing a plurality of pixels in a block according to one embodiment of the invention. The method may be carried out by the encoder circuit 10, as previously described with respect to FIG. 1. However, any other suitable structure may also be used. It will be recognized that the method, beginning with block 210, will be described as a series of operations, but the operations may be performed in any suitable order and may be repeated in any suitable combination.

Generally, each pixel in the block is stored in RGB format, and the encoder calculates the luminance of each pixel so that the resulting luminance values, and hence pixels, can all be sorted into a linear list based on their luminance values. Once the pixels are sorted, the luminance values can be discarded. The encoder then decides where to draw three lines to divide the list of luminance values into four sections or luminance levels so that each pixel is effectively binned into one of the sections. These four sections are what can be referred to as four luminance levels. They are called luminance levels because pixels are grouped together with those other pixels which are closest based on their luminance.

Each section or level containing these groups of pixels will be assigned it's own representative color, and all of the pixels that reside in the same group will be assigned the representative color for that group. The representative color for each group is basically the average color of all the pixels in the group. An iterative process is used to finally place pixels in a given group based on error calculations. The pixel's group assignments are coded in a bitmap which the decoder will use to assign pixel colors (based on the representative color for each group) when the block is uncompressed. A color block type determination is also done as set forth below.

As shown in block 210, the luminance-based pixel grouping generator 40 receives color values associated with each pixel in a block 52. In response, the luminance-level-based representative color generator 20 generates representative color values 58, 66, 67 and 60 for each of a plurality of groups of pixels 364 for each respective luminance level to produce at least a high color value 58, one or more intermediate color values 66, 67 and a low color value 60. Each group of pixels is grouped in one of four different luminance levels (although any suitable number of levels may be used). Additionally, the luminance-level-based representative color generator 20 associates each of the pixels in the block with one of the representative color values 58, 66, 67 and 60 to produce corresponding bitmap values 62. One embodiment for generating the high color value 58, the low color value 60 and the bitmap values 62 is described below.

According to one embodiment, the color values associated with each pixel in the block 52 include eight bits for red color information, eight bits for green color information, and eight bits for blue color information, for a total of 24 color bits. Further, the color values associated with each pixel in the block 52 may further include alpha values as is known in the art. According to one embodiment, the color values associated with each pixel in the block 54 may correspond with a RGB component color space, a CIE L*a*b* color space and a YIL color space, or any suitable color space as previously described.

As show in blocks 220 and 230, the color type block generator 30 generates block color type data indicating a regular color block type 64 when the low color value 60 does not correspond with a near black color value or the high color value 58 does not correspond with a bright color value. This is done, for example, when the intermediate colors can be reproduced by blending the low and high representative colors. According to one embodiment, the color type block generator 30 generates a data packet for a regular block type 72 including any suitable order of at least the bit map values 62, the high color value 58 and the low color value 60, with the block color type data indicating the regular color block type 64.

For example, the near black color value may be based on a range of black color values, such as the bottom 10 or 20 percent (e.g., 15 percent) of the luminance range of pixel luminance values in the block, or if the low color value 60 is less than a predetermined black color threshold value, such as 38 out of a scale of 0 to 255, or any suitable color bit depth. Therefore, if the low color value 60 is within a range of black color values, such as the bottom 10 or 20 percent (e.g., 15 percent) of the luminance range of pixel luminance values in the block, or if the low color value 60 is less than a predetermined black color threshold value, such as 38 out of a scale of 0 to 255 then the low color value 60 would correspond with the near black color value. Similarly, if the low color value 60 is not within a range of black color values, such as the bottom 10, 20 or 30 percent of the luminance range of pixel luminance values in the block, or if the low color value 60 is greater than a predetermined black color threshold value, such as 38 out of a scale of 0 to 255, then the low color value 60 would not correspond with the near black color value. The predetermined black color threshold value may correspond to a value substantially close to zero and may be any suitable value such as 5, 15, 25, 30, 40 or 35 out of a maximum value of 255 for each color component. Further, the black color threshold value may be variable or adaptive depending on the concentration of the number of near black colors in the block and/or based on the distribution of near black colors or bright colors in the block. Similarly, the high color value 58 may correspond with the bright color value when the high color values is within a range of white color values, such as the upper 20, 50 or 60 percent (e.g., 55 percent) of the luminance range of pixel luminance values in the block or when the high color value exceeds a predetermined white color threshold value. The predetermined bright color threshold value may be any suitable value such as 128, 140, 155, or 165 out of a maximum value of 255 for each color component. Further, the white color threshold value may also be variable such that the white color threshold value is adaptive based on the concentration or distribution of bright color values within the block.

As shown in blocks 220 and 240, the color type block generator 30 uses a mid-high color value 66 as a code word corresponding with one of the groups of pixels 364 each associated with a given luminance level, when the low color value 60 corresponds with the near black color value and the high color value 58 corresponds with the bright color value. In this situation, the color type block generator 30 produces the block color type data indicating an alternate color block type 68, other tests may also be used. This is done, for example, when the intermediate colors can not be reproduced by blending the low and high representative colors. According to one embodiment, the color block type generator 30 produces a data packet for an alternate block type 70 including at least the bitmap values 62, the high color value 58, the mid-high color value 66 and the block color type data indicating the alternate color block type 68.

As shown in block 250, as additional tests to determine if a block should be designated an alternate block type, the color type block generator 30 determines if certain of the representative color values 58, 66, 67 and 68 are not near in hue or have saturation levels that are beyond a saturation threshold. For example, the color type block generator determines if the intermediate color values can not be approximated very well by blending the high color value 58 and the low color value 60 together. This may be determined by analyzing the representative color values 58, 66, 67 and 68 according to the hue, saturation, and brightness of the pixels as known in the art. One example of determining if the representative color values 58, 66, 67 and 68 are color saturated or not near in hue is described below with reference to FIG. 8. If certain of the representative color values 58, 66, 67 and 68 are not near in hue or have undesirable saturation levels compared to other of representative color values, then the intermediate color values can not be approximated very well by blending the high color value 58 and the low color value 60 and the color block type generator 30 produces a data packet for an alternate block type 70 as shown in block 240. Otherwise, the color type block generator 30 generates a data packet for the regular block type 72.

For example, if the low-luminance color is near-black and the high-luminance color has a brightness of more than 55% and one of the following is true:
(a) the hues of the high-luminance and medium-high luminance colors are not near to each other; or (b) the hues of the high-luminance and medium-low luminance colors are not near to each other; (c) or the saturation of the medium-high or medium-low colors is greater than twice the saturation of the high color; (d) or the saturation of the medium-high or medium-low colors is greater than a threshold, such as 70% of maximum; then the block is encoded as an alternate block type.

According to one embodiment, the data packet for a regular block type 72 includes a single bit for the block color type data 64, 68 sixteen bits for the high color value 58 and fifteen bits for the low color value 60. The bitmap value 62 corresponds with a two-bit index associated with each of the sixteen pixel locations in the bitmap for a total of thirty-two bits for the bitmap value 62. For example, if only a total of sixteen bits are used to represent either one of the high color value 58 or the low color value 60, then, for example, five bits may be used to represent the red color component, six bits may be used to represent the green color component and five bits may be used to represent the blue color component. If, however, fifteen bits are used to represent either the high color value 58 or the low color value 60, then five bits may be used to represent the red color component, five bits may be used to represent the green color component and five bits may be used to represent the blue color component.

According to one embodiment, the block color type may be identified by the order in which the high color value 58 and the low color value 60 are stored or sent. For example, the regular block color type may be identified when the first color value in the data packet for a regular block type 72 is greater than the second color value. Similarly, an alternate block color type 70 may be indicated when the second color value is greater than the first color value. For example, if the intermediate color value 66 is greater than the high color value 58, then the block color type is an alternate block type 70. Likewise, if the high color value 58 is greater than the low color value 60, then the block color type is a regular block type. Any other suitable convention may be used in order to indicate the block color type 72.

Figure 3:
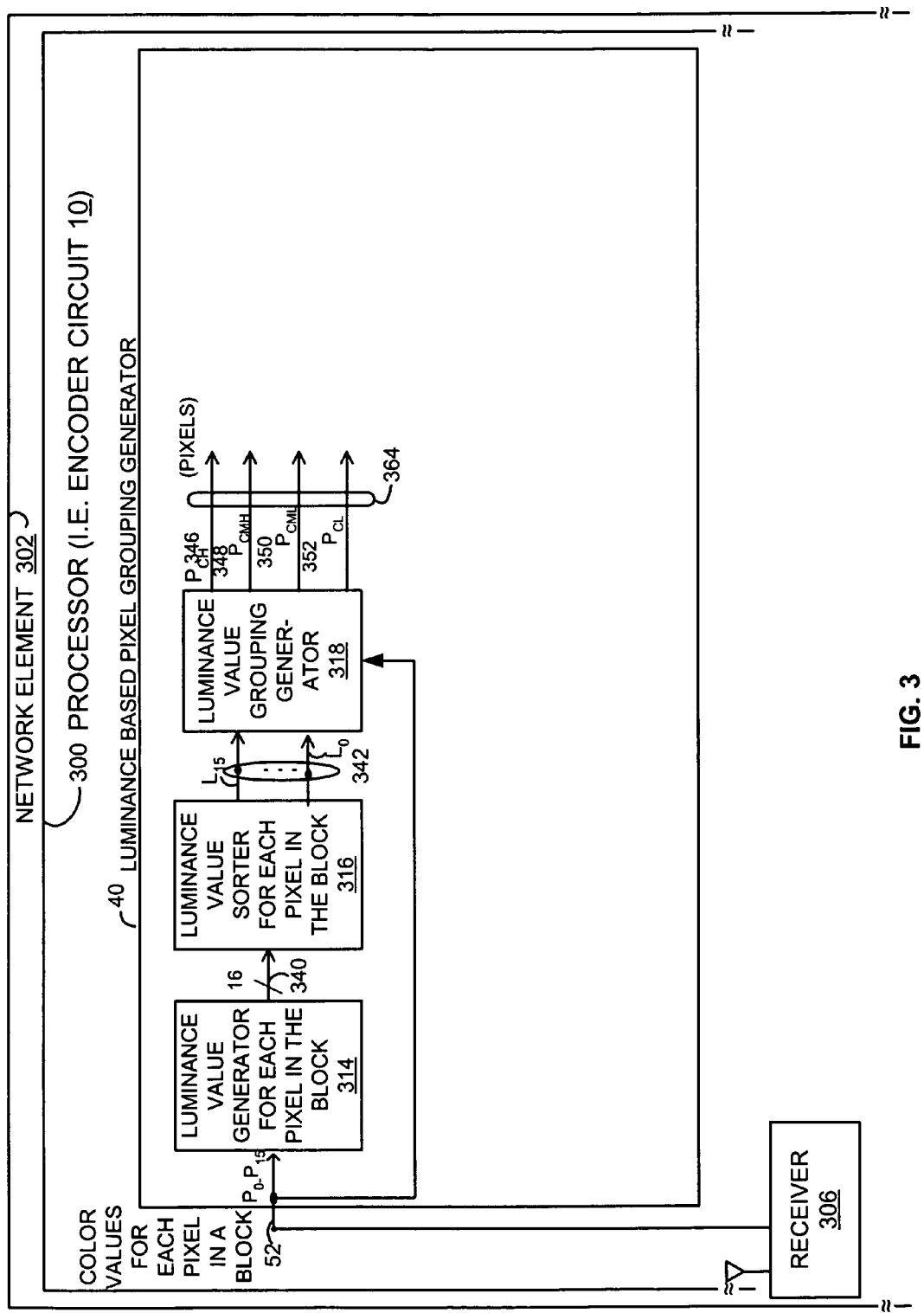
FIGS. 3 and 4 are block diagrams illustrating another example of an apparatus to compress a plurality of pixels in a block in accordance with another exemplary embodiment of the invention.

FIGS. 3 and 4 are block diagrams of a network element 302 including the encoder circuit 10, a transmitter 420, antenna 430 and a receiver 306, according to another embodiment of the invention. According to an alternative embodiment, the network element 302 does not include the receiver 306 and the transmitter 420. According to this embodiment, the network element 302 may be coupled through suitable network connections. The luminance-based pixel grouping generator 40 previously described in FIG. 1 further includes a luminance value generator for each pixel in the block 314, a luminance value sorter for each pixel in the block 316 and a luminance value grouping generator 318. Processor 300 functions as the encoder circuit 10 (e.g., see FIG. 1) to compress a plurality of pixels in a block during the regular block mode and/or the alternate block mode according to one embodiment of the invention. Although functional blocks are shown in the figures, the memory 310 may store any requisite data and in one example stores executable instructions 312 that when executed by the processor cause the processor to carry out the operations described herein by the various blocks and may be, for example, one or more random access memories (RAM), read-only memories (ROM), optical memory or any suitable storage medium located locally or remotely, such as a server or distributed memory, if desired. Additionally, the memory 310 may be accessible by a wireless-base station switching system or any suitable network element via the Internet, such as a wide area network (WAN), a local area network (LAN), a wireless wide access network (WWAN), a wireless local area network (WLAN) such as, but not limited to, an IEEE 802.11 wireless network, a Bluetooth® network, an infrared communication network, a satellite communication network or any suitable communication interface or network.

FIG. 4 is a continuation of the functional block diagram of the processor 300 shown in FIG. 3. The processor 300 further includes the representative color value generator 50 and the color type block generator 30. The representative color value generator 50 as previously shown in FIG. 1 includes a representative color value generator 328, a color error generator 330 and a color grouping selector with lowest error 332. The color type generator 30 further includes a regular/alternate block type generator that includes a normal block type generator 334, alternate block type generator 336 and near black and near bright detectors 338.

Figure 5:
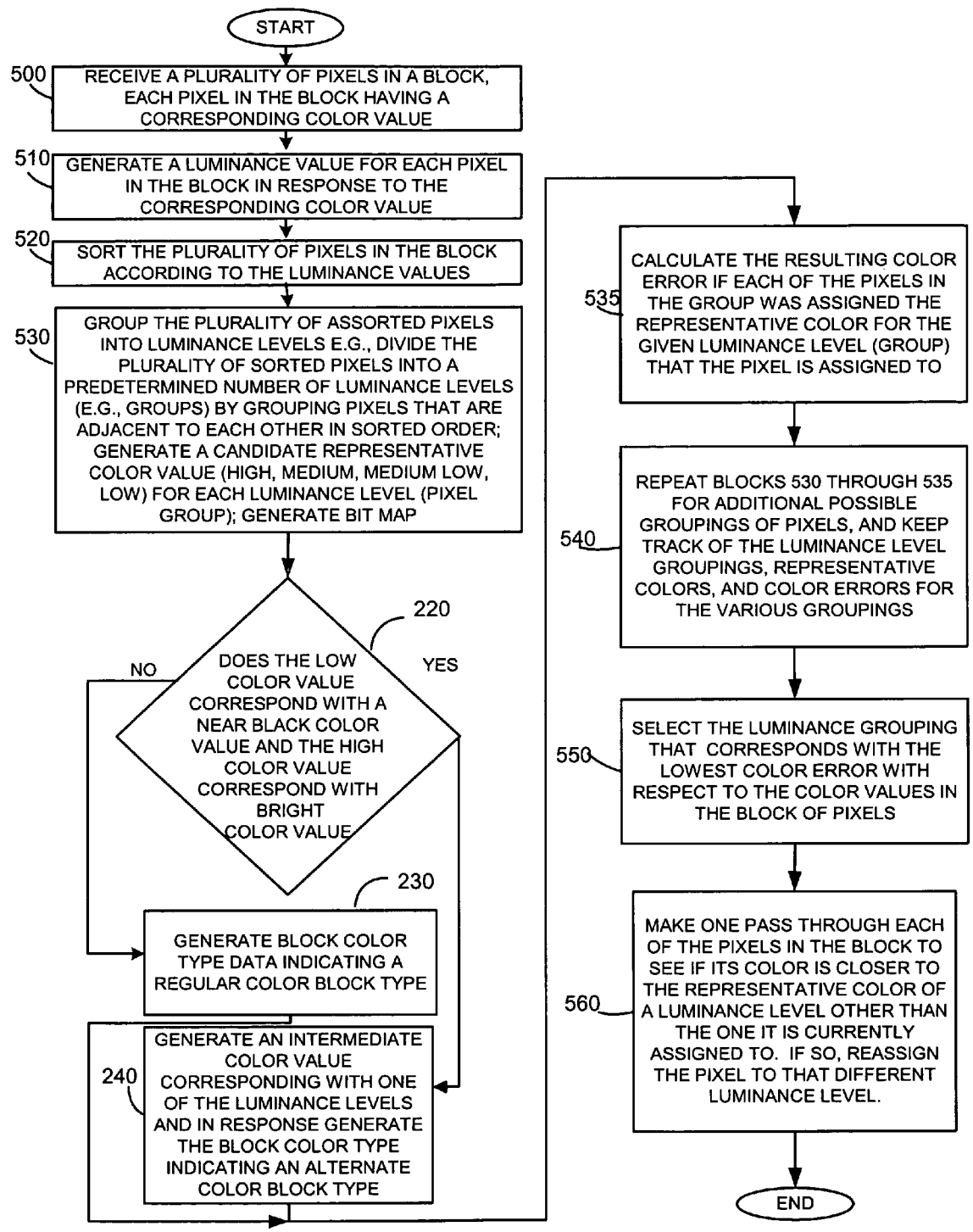
FIG. 5 is a flowchart illustrating another example of a method for compressing a plurality of pixels in a block according to another exemplary embodiment of the invention.

FIG. 5 illustrates a method of compressing an image according to another embodiment of the invention. The method may be carried out by the encoder circuit 10 and/or processor 300. However, any suitable structure may also be used. It will be recognized that the method, beginning with step 500, will be described as a series of operations; however, the operations may be performed in any suitable order and may be repeated in any suitable combination.

As shown in block 500 the luminance value generator for each pixel in the block 314 may receive the color values for each pixel in the block 52. As shown in block 510, in response, the luminance value generator for each pixel in the block 314 may produce luminance values 340 for each corresponding pixel in the block. For example, the luminance information 340 associated with each pixel may be calculated by the following equation: Luminance (R, G, B)=0.30*R+0.59*G+0.11*B. However, any suitable equation may be used. According to one embodiment, the luminance value generator for each pixel in the block 314 may divide an image into a plurality of blocks where each block represents a four-by-four array of pixels or any suitably sized arrays. However, the image may be divided into a plurality of blocks by any stage and by any suitable device.

As shown in block 520, the luminance value sorter for each pixel in the block 316 sorts the plurality of pixels according to the luminance values 340 for each corresponding pixel in the block in order to produce sorted pixels 342.

As shown in block 530, the plurality of sorted pixels are grouped into luminance levels by dividing the sorted pixels into their respective luminance levels (e.g., four). Pixels that are adjacent to each other in sorted order are grouped. A representative (e.g., average) color value for each luminance level (group of pixels) is generated. According to one embodiment, at least four representative luminance levels are used (i.e., that define four luminance level groups) such as a grouping of pixels 346 associated with a high luminance level, a grouping of pixels 348 associated with a medium-high luminance level, a grouping of pixels 350 associated with a medium-low luminance level and a grouping of pixels 352 associated with a low luminance level.

The actual number of groupings provided by the luminance value grouping generator 318 may correspond with the number of desired luminance levels, such as 2, 3, 4, 5, 6, 8 or more and the number of pixel combinations for each luminance level. The luminance value grouping generator 318 may produce, for example, one hundred twenty different grouping of pixels based on luminance levels in order to generate corresponding color error luminance values 368. For example, the high luminance level 346 may initially contain only the fifteenth pixel while varying the low luminance level 352 from no pixels through all pixels except the fifteenth pixel. The high luminance level 346 is expanded to include the next lower luminance pixel (and thus, for example, after the first iteration would contain the fifteenth and fourteenth pixel), and again the luminance value grouping generator 318 tries all the remaining combinations for the low luminance level 352. For each grouping of pixels associated with various representative color values, the representative color value generator 328 generates candidate representative color values 366. For example, for the pixels associated with the high color value 58, the representative color value generator 328 may take the average of the color values of all pixels "binned" in the group of pixels in the high luminance level group or, alternatively, may select one color value to represent the color values that are grouped together by the luminance value grouping generator 318. The remaining candidate color values may be similarly calculated. Each original pixel is then assigned one of the representative color values and an index is stored in the bitmap. Steps in blocks 220, 230 and 240 are carried out to determine whether a block is a regular block type or an alternate block type.

As shown in block 535, the method includes calculating resulting color errors. For example, the (mean square) color error generator 330 produces a (mean square) color error value 368 based on comparing the candidate representative color values 366 with the actual color values of the pixels used to represent the pixel groupings 364.

As shown in block 540 the process is repeated for additional possible groupings of pixels and their groupings in each luminance level is tracked, the representative colors and color errors. As shown in block 550, luminance level groupings that corresponds with the lowest color error with respect to the color values in the block are selected. Stated another way, blocks 318, 328 and 330 iteratively try various pixel groupings. When the error is calculated, it is checked to see if the current error is lower than the lowest error determined up to that point. If so the pixel grouping is logged until a new lower error is found. Although the color error generator 330 is described with respect to a mean square error, any minimal error basis may be used, such as a minimum absolute error and a minimum mean square error.

As shown in block 560, a pass through each of the pixels in a block is made to see if its color is closer to the representative color value of a luminance level other than to the level that it is currently assigned. If so, the pixel is reassigned to that new luminance level.

The regular block type generator 334 produces the data packet for a regular block type 72 as previously described. Further, the alternate block type generator 336 produces the data packet for the alternate block type 78 as previously discussed. The near black and bright detector 338 receives the high color value 58, the mid high color value 66, the mid low color value 67 and the low color value 60 and in response produces the block color type data 64, 68 as previously described.

As such the luminance value grouping generator 318 may also move pixels associated with one luminance level to another in order to produce a better or close color match by using the representative color values associated with another group. Accordingly, one of the pixels associated with a color level may be moved to another color level to better represent the pixel and color. The pixel groupings associated with the luminance levels producing the minimum color error 368 may represent the groupings of pixels providing the lowest mean square error between the representative color values 54 and the original luminance values for each pixel in the block 52. The process then continues to produce the bit map and data packet for sending to a decoder.

FIG. 6 is a block diagram of a wireless device 602, such as a cell phone or any other suitable wireless device, a processor 622, memory 624, a receiver 630 and an antenna 632 according to one embodiment of the present invention. The wireless device 602 includes a processor 622 functioning as, among other things, a decoder circuit 600. The decoder circuit 600 includes an N-level color information generator 610 and a block color information generator 620. The N-level color information generator 610 serves as a color value reconstructor that reconstructs the representative color values not received as data in the received data packet by the receiver. The block color information generator 620 serves as a block reconstructor that reconstructs blocks of pixels using the received bitmap data, the received data representing a first representative color (e.g., shown in this example as the high color value 58 although any representative color value can be received), a second representative color (shown in this example as the low color value 60) and the block color type data 68. The decoder circuit 600 may be one or more suitably programmed processors similar to processor 622, such as a microprocessor, a microcontroller or a digital signal processor (DSP), and, therefore, includes associated memory 624 containing decoder instructions 626 that, when executed, cause the decoder circuit 600 to carry out the operations described herein. In addition, the decoder circuit 600, as used herein, may include discrete logic state machines or any other suitable combination of hardware, software, middleware and/or firmware. According to one embodiment, the decoder circuit 600 is a software module, application or driver executed by processor 622 in the wireless device 602.

The encoder circuit 10 and decoder circuit 600 may be part of a wired or wireless network system, device, a satellite receiver and/or transmitter, a cable box, a suitable set top box, the head end of a system device or any suitable device. According to an alternative embodiment, the wireless device 602 includes the encoder circuit 10, and the network element 302 includes the decoder circuit 600. According to this embodiment the wireless device 602 receives, encodes and transmits the texture or color values for each pixel in the block 52 to the network element 302. According to yet another embodiment, both the encoder circuit 10 and the decoder circuit 600 are part of the wireless device 602. Similarly, the encoder circuit 10 and the decoder circuit 900 may be part of the network element 302.

Although the decoder circuit 600 is shown within wireless device 602, the decoder circuit 600 may alternatively be part of a wireless communication system such as a base station or a switching element or any suitable network element. For example, the encoder circuit 10 may be part of a first network element, such as wireless device 602, and the decoder circuit 900 may be part of a second network element, such as network element 902. According to this embodiment, an image received by the encoder circuit 10 as color values for each pixel in a block 52 are encoded and then transmitted from the network element 302 to a wireless communication network for receipt by the wireless device 602. In response to receiving the compressed image in a data packet for the regular block type 72 or a data packet for the alternate block type 70, the decoder circuit 600 decodes the data packet for the regular block type 72 or the data packet for the alternate block type 70 and recreates the image. Alternatively, the network element 302 may transmit an unencoded or uncompressed image to a wireless communication network where the encoder circuit 10 is within the (wireless communication) network element 302 such as a base station, web server, other server or a switching system. In response to receiving the uncompressed image, the encoder circuit 10 receiving texture values for each pixel in the block 52 compresses the image and forwards the compressed image to a decoder circuit 900 within the network element 302 or to another network element within the wireless communication system for decoding.

According to one embodiment, the encoder circuit 10 and decoder circuit 600 may be part of a computer such as a personal computer. More specifically, the encoder circuit 10 and decoder circuit 600 may be part of any suitable component within the computer, such as part of a central processor, or a coprocessor such as a videographics processor. Accordingly, the computer may receive an uncompressed image and compress the image via the encoder circuit 10 for transmission to another suitable device including the decoder circuit 900, such as another computer, another network element, or a telephone, satellite receiver cable box, the head end of a system device, the network element 302 or any other suitable device. Additionally, the encoder circuit 10 and decoder circuit 900 may be used to compress images for storage within memory of a computer system such as a hard disk drive, RAM or any other suitable memory.

Figure 7:
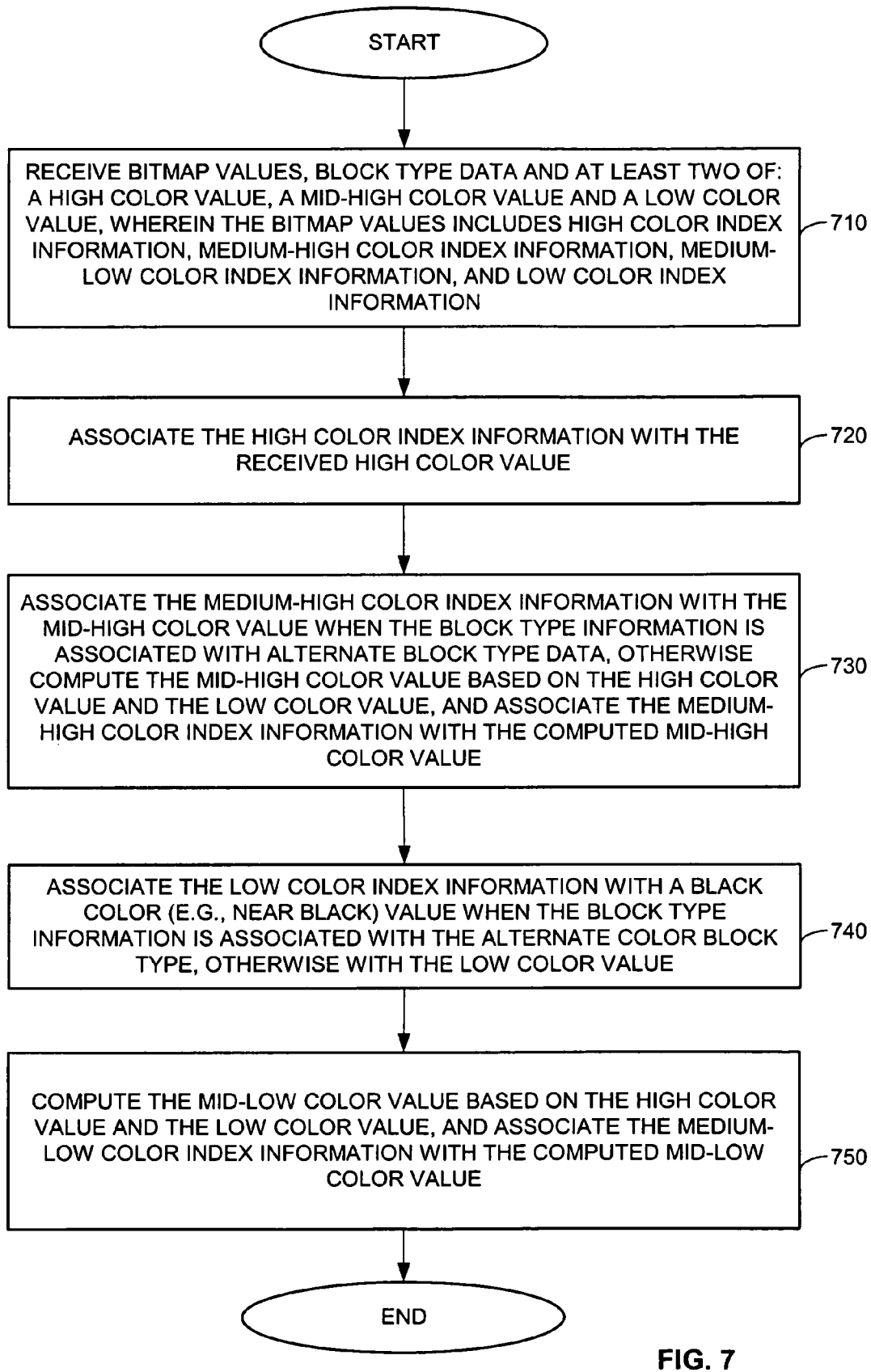
FIG. 7 is a flowchart illustrating one example of a method for decoding compressed data according to one exemplary embodiment of the invention.

FIG. 7 illustrates a decoding method according to one embodiment of the present invention. The method may be carried out by the decoder circuit 600. However, any other suitable structure may also be used. It will be recognized that the method will be described as a series of operations, but the operations may be performed in any suitable order and may be repeated in any suitable combination.

As shown in block 710, the N-level color information generator 610 receives the block color type data 68, 64, as well as data representing at least two representative colors such as two of: the high color value 58, the intermediate (mid-high) color value 66 and the low color value 60 and, in response, produces at least one of: the mid-low color value 67 and the mid-high color value 66. For example, when the block color type data indicates an alternate type block 68, then the N-level color information generator 610 may compute the following values as follows:

the mid-low color value 67=low value 60−¼*high color value 58, and the low color value 60=a black color value. However, because this is an alternate color block type, the low color value is not sent in the data packet to the decoder. Instead, the two representative colors that are actually sent are the high color value and the medium high color value since the block type indication of "alternate" tells the decoder to use the second color (medium high) as the medium high color and not as the low color as would be the case for a regular color block type. For alternate color block types, the low color is assumed to be near black by the decoder.

The block color information generator 620 receives the bitmap values 62. The bitmap values 62 include high color index information, mid-high color index information, mid-low color index information and low color index information. As shown in block 720, the block color information generator 620 associates pixels corresponding to the high color index information with the received high color value 58.

As shown in block 730, the N level color information generator 610 associates the second color value with the mid-high color value 66 when the block color type information is associated with the alternate color block type 68, or otherwise the N level color information generator computes the mid-high color value 66 based on the first color value (high color value 58) and associates the mid-high color index information with the computed intermediate (mid-high) color value 66. For example, when the block color type data indicates a regular color type block 64, then the N-level color information generator 610 may compute the following value:

the mid-high color value 66=⅜* low color value 60+⅝* high color value 58 (refer also to block 610).As shown in block 740, the N-level color information generator 610 associates the low color index information with a near black color value when the block color type information indicates the alternate color block type 68, otherwise with the low color value 60.

As shown in block 750, the N-level color information generator 610 computes the mid-low color value 67 based on the high color value 58 and the low color value 60, and the block color information generator 620 associates the mid-low color index information with the computed mid-low color value 67. For example, when the block color type data indicates a regular color type block 64, then the N-level color information generator 610 may compute the following value:

the mid-low color value 67=⅝* low color value 60+⅜* high color value 58.

Figure 8:
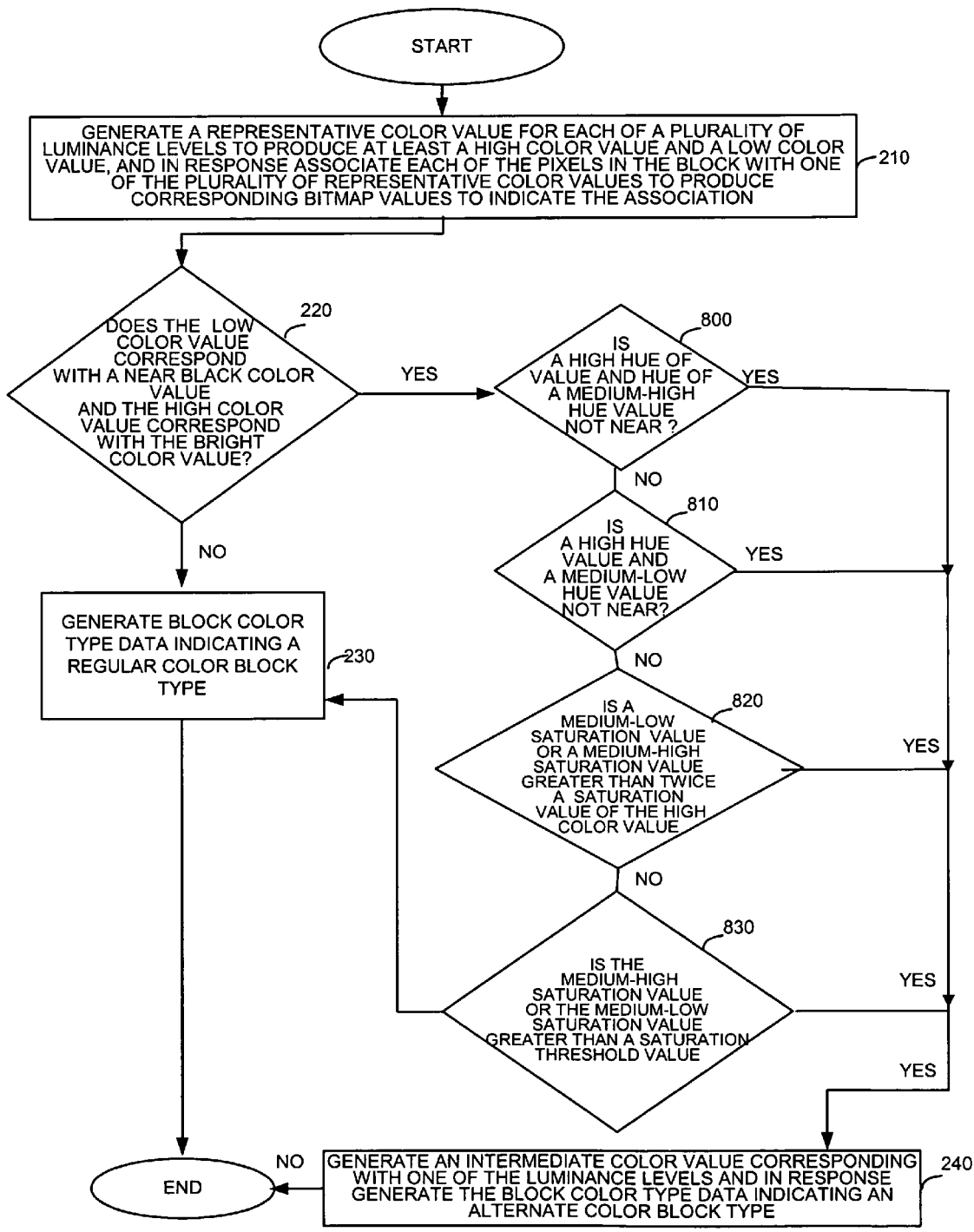
FIG. 8 is a flowchart illustrating one example of a method for encoding compressed data according to one exemplary embodiment of the invention.

FIG. 8, is a flow chart of a method for encoding texture data according to an alternative embodiment. As shown in blocks 220 and 800, the color type block generator 30 generates the block color type data indicating the alternate color block type 70 when the low color value 60 corresponds with the near black color value (e.g., is above or below a saturation threshold—in this case below a brightness of 15%), the high color value 58 corresponds with the bright color value (e.g., is 55% of maximum brightness) and at least the representative color values are not near in hue and have undesireable saturation levels. As shown in block 800, the color type block generator 30 determines if the hue of the high color value 58 and the hue of the medium-high color value 66 are not near, e.g. less than 20-50 degrees, e.g. 30 degrees apart, on a color wheel.

As shown in block 810, the color type generator 30 determines if the hue of the high color value 58 and a hue of the medium low value 67 are not near, i.e., less than 20-50 degrees, e.g., 30 degrees on the color wheel. If either block 800 or 810 is true, then processing continues with block 240.

As shown in block 820, the color type generator 30 determines if a saturation value of the medium low color value 67 or a saturation value of the medium-high color value 66 is greater than twice a saturation value of the high color value 58.

For example, the corresponding percentages of hue corresponding to the medium low color value 67, medium high color value 66 and high color value 58 may be compared as previously described. As shown in block 830, the color type generator 30 determines if a saturation value of the intermediate (medium-high) color value 66 or the medium-low color value 67 is greater than a saturation threshold value (i.e., 50-90 such as 70 or any suitable threshold value). If either block 820 or 830 is true then processing continues with block 240 to generate an alternate color block type, otherwise processing continues with block 230 to generate a regular color block type.

It will be recognized that the alternate color block type data can be generated without regular color block type data such as where the decoder assumes that receipt of no color block type data in a packet means regular coding but receiving a bit(s) indicates alternate color block type coding. It will also be recognized that although in one described embodiment two intermediate color values are generated, that one or more than two could also be used if desired.

Among other advantages, the encoder circuit 10 and method adapts to different levels of color diversity within the block in order to accurately represent diverse colors in a block while achieving a high level of data compression. According to one embodiment, the encoder circuit 10 identifies conditions when colors within the pixel block are relatively diverse. For example, the various colors within the pixel block may be diverse when one or more colors in the block represent near black color values and one or more colors in a block represent bright color values. In this situation, one of the encoded color values represents an intermediate color value 66 so that, when a block includes a bright color value or a near black color value, the encoder circuit 10 may send one of the intermediate color values as a codeword instead of only the representative high and low color values from which the decoder derives the intermediate values. As a result, the encoder circuit 10 may accurately represent one or more actual intermediate colors within the block without having to rely on deriving or interpolating one or more intermediate color values in the block. Consequently, since the encoder circuit 10 produces, as one of the code words, an actual intermediate color value 66 rather than an estimated or interpolated color value, the resulting decoded image will much more accurately represent the original image than if one of the intermediate color values 66 were computed from diverse colors such as bright and near black. The encoder circuit 10 and decoder circuit 600 therefore provides excellent texture image quality as well as a high level of data compression. Further, the encoder circuit 10 and decoder circuit 600 can be incorporated efficiently and inexpensively in hardware and/or software.

For example, for regular color block type, the representative high and low colors are used as code words and the decoder derives the medium high and medium low colors from these two sent color values. For alternate color block type, where the encoder determined that that the low color is near black, the encoder uses the high color value and one of the intermediate color values, such as medium high, to allow the decoder to derive the medium low and low colors. This allows a more accurate representation of an intermediate color when a representative color is near black.

By way of further illustration, the encoder breaks the image into 4×4 non-overlapping blocks, which are compressed individually. Both RGB and RGBA textures (or any other data) can be compressed. For RGBA textures, the encoder creates 2 blocks, a compressed RGB block and an alpha block. The alpha block is a 4×4 block with 4 bits of alpha per pixel. The RGB block is a 4×4 block with 2 colors and a 2-bit mask per pixel.

Decoder

TABLE A

RGB compressed image type

| color block type | color0 (RGB 555) | color1 (RGB 565) | |
|---|---|---|---|
| $T_{00}$ | $T_{01}$ | $T_{02}$ | $T_{03}$ |
| $T_{10}$ | $T_{11}$ | $T_{12}$ | $T_{13}$ |
| $T_{20}$ | $T_{21}$ | $T_{22}$ | $T_{23}$ |
| $T_{30}$ | $T_{31}$ | $T_{32}$ | $T_{33}$ |

Table A describes the RGB compressed block format generated by the encoder. A specific bit is used to indicate if the block uses the alternate color block type. This bit is used by the decoder to determine which of two functions it should use to generate the intermediate colors.

Decoding a compressed block that uses the regular color block type

The 2-bit pixel mask is used to select from the two base colors and/or two generated colors. The two generated colors are computed as follows:

Color 2=⅝ of color0+⅜ of color1

Color 3=⅜ of color0+⅝ of color1

TABLE B

Pixel bit-mask to color mapping table

| Bit-mask | Selected Color |
|---|---|
| 00 | Base color 0 |
| 01 | Generated color 2 |
| 10 | Generated color 3 |
| 11 | Base color 1 |

Decoding a Compressed Block that Uses the Alternate Color Block Type

The 2-bit pixel mask is used to select from the two base colors, a third generated color and the color black. The generated color is computed as follows:

Color2=color0−¼ of color1

TABLE C

Pixel bit-mask to color mapping table

| Bit-mask | Selected Color |
|---|---|
| 00 | Black |
| 01 | Generated color 2 |
| 10 | Base color 0 |
| 11 | Base color 1 |

Encoder

Given a 4×4 block of RGB color values, the encoder's job is to divide the 16 pixels into 4 groups and to choose a representative color for each group. Two of the colors will be encoded and two more will be derived from these two.

The encoder divides the pixels into groups by exploiting the fact that change in luminance is usually accompanied by change in color. The luminance values of the pixels are calculated and arranged into a sorted list. Next, the encoder tries various groupings of adjacent pixels (based on the sorted luminance list) to determine which grouping produces the least error between the original image and the image that would be reconstructed by the decoder. The representative color for each group will be the center of gravity of the colors of the pixels that belong to the group.

Because pixels were grouped with others that had similar luminance values, it is possible that a pixel in one group may be closer in color space to the representative color of another group. For this reason we make an addition pass through the pixels and move any pixel that would be rendered more accurately by using the color associated with another group.

Once the optimal pixel grouping and representative colors have been determined, the low-luminance group color, the high-luminance group color, a set of 2-bit indices, and a color block type indicating a regular color block type are encoded as previously described in the decoder section.

In addition to what has just been described, the encoder watches for the special case where the low-luminance group color is near black, the high-luminance group color is bright, and the middle colors can't be derived from these two. Imagine a 4×4 block containing black, white, and red. The red color cannot be re-produced by blending the high and low-luminance group colors of black and white. To accommodate this situation, our encoder encodes the medium-high-luminance group color instead of the low-luminance group color and encodes a color type indicating an alternate color block type. When the decoder gets this block it uses black as the low-luminance group color and uses an alternate formula to calculate the medium-low-luminance group color. Alpha values, if present, are converted to 4 bits and stored in a separate block adjacent to the color block.

It is understood that the implementation of other variations and modifications of the present invention and its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

The invention claimed is:

1. A method of encoding a plurality of pixels in a block, each pixel in the block having an original corresponding color value and a corresponding luminance value, the method comprising:

generating a representative color value for each of a plurality of luminance levels to produce at least a high color value, at least an intermediate color value and a low color value and, in response, associating each of the pixels in the block with one of the plurality of representative color values to produce corresponding bitmap values to indicate the association; and generating block color type data indicating at least an alternate color block type based on at least comparing the representative low color value to a first brightness threshold and comparing the high color value to a second brightness threshold.

2. The method of claim 1, wherein the block color type data indicating the alternate color block type is generated when: a) the low color value corresponds with the near black color value, b) the high color value corresponds with the bright color value and c) the representative color values are at least one of: not near in hue and a saturation level of at least one intermediate color value is beyond a threshold.

3. The method of claim 1 including performing at least one of: generating block color type data indicating a regular color block type when the low color value does not correspond with a near black color value or the high color value does not correspond with a bright color value.

4. The method of claim 1 wherein generating the block color type data indicating an alternate color block type is generated when the low color value corresponds with a near black color value and the high color value corresponds with a bright color value.

5. The method of claim 1, wherein generating the representative color values for each of the plurality of luminance levels further includes selecting representative color values corresponding with a minimum color error with respect to the original color values for the pixels in the block.

6. The method of claim 5, wherein selecting representative color values corresponding with the minimum color error further includes minimizing at least one of: an absolute color error, a square color error and a mean square color error.

7. The method of claim 1, wherein generating representative color values for each of the plurality of luminance levels includes at least one of: averaging and selecting one of the original color values corresponding with the pixels in the block.

8. The method of claim 4, including:
sending a data packet including at least the bitmap values, the high color value, the intermediate color value and the alternate block color type data when the low color value corresponds with the near black color value and the high color value corresponds with the bright color value and
sending a data packet including at least the bitmap values, the high color value, the low color value and a regular block color type data when the low color value does not correspond with the near black color value or the high color value does not correspond with the bright color value.

9. The method of claim 4, wherein the low color value corresponds with the near black color value when the low color value exceeds a black color threshold value and the high color value corresponds with the bright color value when the brightness of the high color value exceeds a brightness threshold value.

10. The method of claim 1 including: wherein the representative color values further include at least one intermediate color value corresponding with a fourth luminance level.

11. A method of encoding a plurality of pixels in a block, each pixel in the block having an original corresponding color value and a corresponding luminance value, the method comprising:

generating a representative color value for each of a plurality of luminance levels to produce at least a high color value, an intermediate color value and a low color value;
grouping each of the original color values for the pixels in the block amongst the representative color values and, in response, selecting the representative color values having a grouping of color values for the pixels in the block such that the selected representative color values correspond with a minimum color error with respect to the original color values in the block;
associating each of the pixels in the block with one of the plurality of selected representative color values to produce corresponding bitmap values to indicate the association;
generating block color type data indicating a regular color block type when the low color value does not correspond with a near black color value or the high color value does not correspond with a bright color value; and
generating block color type data indicating an alternate color block type corresponding with one of the selected representative color values, when the low color value corresponds with the near black color value and the high color value corresponds with the bright color value.

12. The method of claim 11, wherein the minimum color error with respect to the color values in the block further includes at least one of: a minimum absolute error, a minimum mean square error and a minimum square error.

13. The method of claim 11, wherein generating representative color values for each of the plurality of luminance levels includes at least one of: averaging and selecting one of the grouping of color values corresponding with the representative color value.

14. The method of claim 11, including:
sending a data packet including at least the bitmap values, the high color value, the mid-high color value and the block color type data when the block color type data indicate the alternate color block type; and
sending a data packet including at least the bitmap values, the high color value, the low color value and the block color type data when the block color type data indicate the regular color block type.

15. The method of claim 11, wherein the low color value corresponds with the near black color value when the low color value exceeds a black color threshold value and the high color value corresponds with the bright color value when a brightness of the high color value exceeds a brightness threshold value.

16. A method of encoding a plurality of pixels in a block, each pixel in the block having an original corresponding color value and a corresponding luminance value, the method comprising:

sorting the plurality of pixels in the block according to the luminance values;
grouping the plurality of sorted pixels into a plurality of luminance levels;
generating a representative color value for each of the plurality of luminance levels to produce at least a high color value, an intermediate color value and a low color value, such that the representative color values correspond with a minimum error with respect to the original color values in the block and, in response, associating each of the pixels in the block with one of the plurality of color values to produce corresponding bitmap values;
generating block color type data indicating a regular color block type when the low color value does not correspond with a near black color value or the high color value does not correspond with a bright color value; and generating block color type data indicating an alternate color block type when the low color value corresponds with the near black color value and the high color value corresponds with the bright color value.

17. The method of claim 16, including:
sending a data packet including at least the bitmap values, the high color value, the intermediate color value and the block color type data when the block color type data indicate the alternate color block type; and
sending a data packet including at least the bitmap values, the high color value, the low color value, and the block color type data when the block color type data indicate the regular color block type.

18. The method of claim 16, wherein the minimum color error with respect to the original color values in the block further includes at least one of: a minimum absolute error, a minimum mean square error and a minimum square error.

19. The method of claim 16, wherein generating representative color values for each of the plurality of luminance levels includes at least one of: averaging and selecting one of the color values corresponding with the pixels in the block.

20. An encoder circuit to compress a plurality of pixels in a block, each pixel in the block having a corresponding original color value and a corresponding luminance value, the encoder circuit comprising:
a luminance-level-based representative color generator operative to generate a representative color value for each of a plurality of luminance levels to produce at least a high color value, an intermediate color value and a low color value and in response, associate each of the pixels in the block with one of the plurality of representative color values to produce corresponding bitmap values to indicate the association;
a color type block generator, operatively coupled to the luminance-level-based representative color generator and operative to:
generate block color type data indicating an alternate color block type based on at least comparing the representative low color value to a first brightness threshold and comparing the high color value to a second brightness threshold.

21. The encoder circuit of claim 20 wherein the color type block generator is also operative to generate block color type data indicating a regular color block type when the low color value does not correspond with a near black color value or the high color value does not correspond with a bright color value.

22. The encoder circuit of claim 21 wherein the color type block generator is operative to generate the alternate block color type data when the low color value corresponds with the near black color value and the high color value corresponds with the bright color value.

23. The encoder circuit of claim 21, further including a memory operatively coupled to the block color type generator, the memory having data including:
the bitmap values, the high color value, the intermediate color value and the block color type data when the block color type data indicates the alternate color block type; and
the bitmap values, the high color value, the low color value and the block color type data when the block color type data indicates the regular color block type.

24. The encoder circuit of claim 20, wherein the luminance-level-based representative color generator is operative to select corresponding representative color values corresponding with a minimum color error with respect to the color values.

25. The encoder circuit of claim 24, wherein the luminance-level-based representative color generator is operative to produce the minimum color error based on at least one of: an absolute color error, a square color error and a mean square error.

26. The encoder circuit of claim 20, wherein the luminance-level-based representative generator is operative to generate the representative color values for each of the plurality of luminance levels based on at least one of: averaging and selecting one of the color values corresponding with the pixels in the block associated with the plurality of representative color values.

27. The encoder circuit of claim 20, wherein the low color value corresponds with the near black color value when the low color value exceeds a black color threshold value and the high color value corresponds with the bright color value when the high color value exceeds a brightness threshold value.

28. An encoder circuit to compress a plurality of pixels in a block, each pixel in the block having a corresponding original color value and a corresponding luminance value, the encoder circuit comprising:
a luminance-based pixel grouping generator operative to generate a plurality of luminance levels and, in response, group each of the pixels in the block with one of the plurality of luminance levels;
a representative color value generator, operatively coupled to the luminance-based pixel grouping generator and operative to generate a representative color value for each of the plurality of luminance levels to produce at least a high color value, an intermediate color value and a low color value, such that the representative color values correspond with a minimum error with respect to the original color values in each block and, in response, associate each of the pixels in the block with one of the plurality of color values to produce corresponding bitmap values;
a color type block generator operatively coupled to the representative color value generator and operative to:
generate block color type data indicating a regular color block type when the low color value does not correspond with a near black color value or the high color value does not correspond with a bright color value; and
generate block color type data indicating an alternate color block type when the low color value corresponds with the near black color value and the high color value corresponds with the bright color value.

29. The encoder circuit of claim 28, further including a memory operatively coupled to the block color type generator, the memory having data including:
the bitmap values, the high color value, the intermediate color value and the block color type data when the block color type data indicate the alternate color block type; and
the bitmap values, the high color value, the low color value and the block color type data when the block color type data indicate the regular color block type.

30. A decoding method comprising:
receiving bitmap values, block color type data and at least two of: a high color value, a mid-high color value and a low color value, wherein the bitmap values include high color index information, mid-high color index information, mid-low color index information and low color index information;
associating the high color index information with the received high color value;

associating the mid-high color index information with the mid-high color value when the block color type information is associated with an alternate color block type, otherwise computing the mid-high color value based on the high color value and the low color value and associating the medium-high color index information with the computed mid-high color value;

computing the mid-low color value based on the high color value and the low color value and associating the medium-low color index information with the computed mid-low color value; and associating the low color index information with a black color value when the block color type information is associated with the alternate color block type, otherwise with the low color value.

31. The decoding method of claim 30, including generating block color values for each pixel in the block in response to associating each of the pixels in the block in accordance with the bitmap values.

32. A decoder circuit comprising:

an N-level color information generator operative to receive block color type data and at least two of: a high color value, a mid-high color value and a low color value and, in response, produce at least one of: a mid-low color value and a mid-high color value; and associate the high color index information with the received high color value;

associate the mid-high color index information with the mid-high color value when the block color type information is associated with an alternate color block type, otherwise compute the mid-high color value based on the high color value and the low color value and associate the mid-high color index information with the computed mid-high color value;

compute the mid-low color value based on the high color value and the low color value and associate the mid-low color index information with the computed mid-low color value; and associate the low color index information with a black color value when the block color type data is associated with the alternate color block type, otherwise with the low color value; and a block color information generator, operatively coupled to the N-level color information generator and operative to receive bitmap values, wherein the bitmap values include high color index information, mid-high color index information, mid-low color index information and low color index information.

33. The decoder circuit of claim 30, wherein the block color information generator is operative to generate block color values in response to associating each of the pixels in the block in accordance with the bitmap information.

34. A graphics processor operative to compress a plurality of pixels in a block, each pixel in the blocking having a corresponding original color value and a corresponding luminance value, the graphics processor including an encoder circuit comprising:

a luminance-level-based representative color generator operative to generate a representative color value for each of a plurality of luminance levels to produce at least a high color value, an intermediate color value and a low color value and, in response, associate each of the pixels in the block with one of the plurality of representative color values to produce corresponding bitmap values;

a color type block generator, operatively coupled to the luminance-level-based representative color generator and operative to:

perform at least one of: generating block color type data indicating an alternate color block type based on at least comparing the representative low color value to a first brightness threshold and comparing the high color value to a second brightness threshold.

35. The graphics processor of claim 34 wherein the color type block generator is operative to generate block color type data indicating a regular color block type when the low color value does not correspond with a group of black color values or the high color value does not correspond with a group of bright color values.

36. The graphics processor of claim 34, further including a memory operatively coupled to the block color type generator, the memory having data including:

the bitmap values, the high color value, the intermediate color value and the block color type data when the block color type data indicate the alternate color block type; and the bitmap values, the high color value, the low color value and the block color type data when the block color type data indicate the regular color block type.

37. A network element including an encoder circuit to compress a plurality of pixels in a block, each pixel in the block having a corresponding luminance value, the encoder circuit comprising:

a luminance-level-based representative color generator operative to generate a representative color value for each of a plurality of luminance levels to produce at least a high color value, an intermediate color value and a low color value and, in response, associate each of the pixels in the block with one of the plurality of representative color values to produce corresponding bitmap values;

a color type block generator, operatively coupled to the luminance level-based representative color generator and operative to:

generate block color type data indicating a regular color block type when the low color value does not correspond with a near black color value or the high color value does not correspond with a bright color value; and generate block color type data indicating an alternate color block type when the low color value corresponds with the near black color value and the high color value corresponds with the bright color value;

a transmitter, operatively coupled to the color type block generator and operative to:

transmit the bitmap values, the high color value, the mid-high color value and the block color type data when the block color type data indicate the alternate color block type; and transmit the bitmap values, the high color value, the low color value and the block color type data when the block color type data indicate the regular color block type.

38. The network element of claim 37 further including a memory operatively coupled to the block color type generator, the memory having data including:

the bitmap values, the high color value, the mid-high color value and the block color type data when the block color type data indicate the alternate color block type; and the bitmap values, the high color value, the low color value and the block color type data when the block color type data indicate the regular color block type.

39. A wireless device comprising:

a receiver operative to receive block color type data and at least two of: a high color value, a mid-high color value and a low color value;

a decoder circuit operatively coupled to the receiver, the decoder circuit including:
an N-level color information generator operative to produce at least one of: a mid-low color value and a mid-high color value in response to the received block color type data and the at least two of: the high color value, the mid-high color value and the low color value;
associate the high color index information with the received high color value;
associate the mid-high color index information with the mid-high color value when the block color type information is associated with an alternate color block type, otherwise compute the mid-high color value based on the high color value and the low color value and associate the mid-high color index information with the computed mid-high color value;
compute the mid-low color value based on the high color value and the low color value and associate the mid-low color index information with the computed mid-low color value; and
associate the low color index information with a black color value when the block color type data is associated with the alternate color block type, otherwise with the low color value; and
a block color information generator, operatively coupled to the N-level color information generator, and operative to receive bitmap values, wherein the bitmap values include high color index information, mid-high color index information, mid-low color index information and low color index information.

40. The wireless device of claim 39, wherein the block color information generator is operative to generate block color values in response to associating each of the pixels in the block in accordance with the bitmap information.

41. A decoder circuit comprising:
an N-level color information generator operative to determine block color type and at least two representative color values of: a high color value, a mid-high color value and a low color value and, in response, produce at least one of: a mid-low color value and a mid-high color value, and wherein determining the block color type is based on a detected ordering of the representative color values; and
a block color information generator, operatively coupled to the N-level color information generator and operative to receive bitmap values, wherein the bitmap values include high color index information, mid-high color index information, mid-low color index information and low color index information and, in response:
associate the high color index information with the received high color value;
associate the mid-high color index information with the mid-high color value when the block color type information is associated with an alternate color block type, otherwise compute the mid-high color value based on the high color value and the low color value and associate the mid-high color index information with the computed mid-high color value;
compute the mid-low color value based on the high color value and the low color value and associate the mid-low color index information with the computed mid-low color value; and
associate the low color index information with a black color value when the block color type data is associated with the alternate color block type, otherwise with the low color value.

42. An encoder circuit to compress a plurality of pixels in a block, each pixel in the block having a corresponding original color value and a corresponding luminance value, the encoder circuit comprising:
a luminance-level-based representative color generator operative to generate a representative color value for each of a plurality of luminance levels to produce at least a high color value and a low color value and in response, associate each of the pixels in the block with one of the plurality of representative color values to produce corresponding bitmap values;
a color type block generator, operatively coupled to the luminance-level-based representative color generator and operative to indicate a color block type by ordering at least two of the representative colors in a particular manner and wherein the color type block generator is operative to determine the ordering based on at least comparing the representative low color value to a first brightness threshold and comparing the high color value to a second brightness threshold.

* * * * *